United States Patent
Funke

(10) Patent No.: US 6,485,162 B2
(45) Date of Patent: Nov. 26, 2002

(54) EGG LIGHT

(76) Inventor: Peter Funke, Braukweg 4, Eslohe (DE), 59889

( * ) Notice: Subject to any disclaimer, the term of this patent is extended or adjusted under 35 U.S.C. 154(b) by 0 days.

(21) Appl. No.: 09/760,578

(22) Filed: Jan. 16, 2001

(65) Prior Publication Data

US 2002/0126486 A1 Sep. 12, 2002

(30) Foreign Application Priority Data

Jan. 19, 2000 (DE) ..................... 200 00 885 U

(51) Int. Cl.$^7$ .............................................. F21V 33/00
(52) U.S. Cl. .................... 362/253; 362/806; D26/125
(58) Field of Search .................. 362/806, 253, 362/234, 341, 296, 347–350; D26/72–74, 85–87, 93, 94, 104–112, 125

(56) References Cited

U.S. PATENT DOCUMENTS

| | | | | |
|---|---|---|---|---|
| 2,815,439 A | * | 12/1957 | Plubell | 362/806 X |
| D217,383 S | * | 4/1970 | Benedetto | |
| 5,138,535 A | * | 8/1992 | Aragon, Jr. | 362/253 X |
| D360,478 S | * | 7/1995 | Freund | |
| 5,545,069 A | * | 8/1996 | Glynn et al. | 362/806 |
| 5,743,782 A | * | 4/1998 | Glynn et al. | 362/253 X |
| 5,822,088 A | * | 10/1998 | Danno et al. | 362/806 X |

* cited by examiner

*Primary Examiner*—Laura K. Tso
(74) *Attorney, Agent, or Firm*—Richard M. Goldberg

(57) ABSTRACT

A light with a lamp and a reflector, includes a reflector formed by one surface of a kitchen utensil and having a reflector surface, and at least one lamp incorporated in at least one egg-shaped body which is transparent or translucent and which is fixed to the kitchen utensil in front of the reflector surface.

10 Claims, 3 Drawing Sheets

EGG LIGHT

BACKGROUND OF THE INVENTION

The invention relates to a light with a lamp and a reflector.

In numerous lights the lamp is disposed in front of a reflector which ensures that the light radiated from the amp is oriented primarily in a certain direction. In most cases, reflectors are made from thin sheets of aluminum, steel or stainless steel, which may be chrome-plated. These sheets are fixed by some suitable means to or in the light's stand, housing or frame. Hence a relatively large number of components are always required to construct a light with its housing, the reflector and the lamp.

SUMMARY OF THE INVENTION

This invention is based on the task of providing a particularly simple light construction equipped with both a reflector and a lamp.

In a light of the above type, this task is solved in that the reflector is formed by one surface of a kitchen appliance, and in that at least one lamp is incorporated in at least one egg-shaped transparent or translucent body which is fixed to the kitchen appliance in front of the reflector surface.

The term 'kitchen appliance' as used in this invention does not refer to the usual fitted kitchen appliances such as ovens, dishwashers or microwave ovens, for which this tern is occasionally used. The invention relates far more to manual work utensils of the kind used in commonplace kitchen tasks.

Numerous kitchen utensils of this type are made from metals and, for aesthetic and hygienic reasons, have a smooth, e.g. chrome-plated or polished surface. This is the case for e.g. manual utensils such as ladles, skimmers, straining spoons, sieves or similar. In certain instances these utensils also have a bowl-shaped curved surface which is particularly suitable for use as a reflector surface. According to the invention, a lamp incorporated in a body in the shape of an egg is fixed in front of surfaces such as these.

The power supply line can run in some concealed place, e.g. along the back of the handle of a kitchen utensil, or can possibly also be ran inside a hollow handle, insofar as This is available.

The light consisting of the kitchen utensil and the lamp can e.g. be fixed to a supporting plate, thereby forming a lighting element in an original design that is particularly suitable for use in kitchens.

BRIEF DESCRIPTION OF THE DRAWINGS

Preferred examples of embodiments of the invention will be described in more detail below with reference to the enclosed drawings, in which.

DETAILED DESCRIPTION

Figure 1:
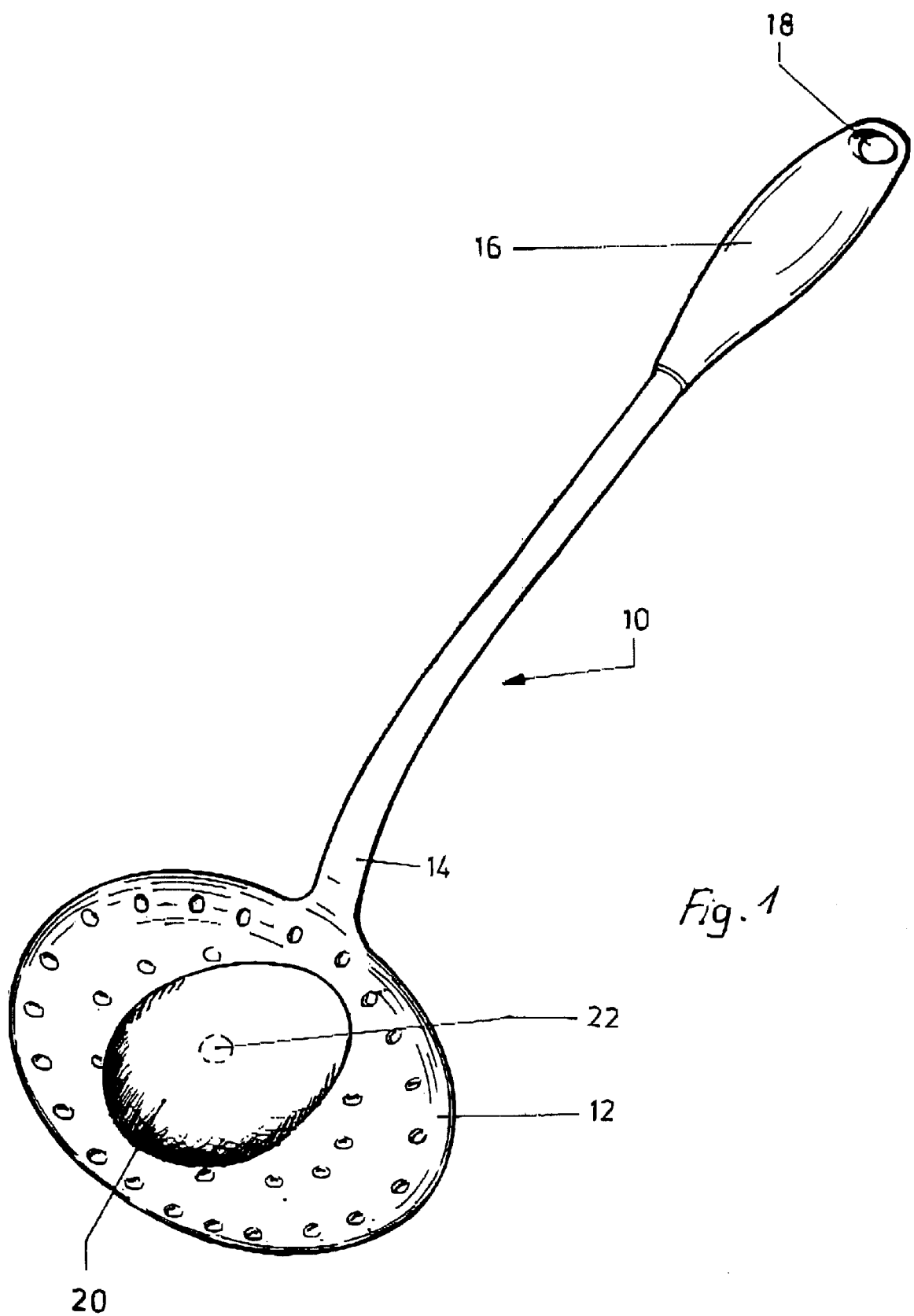
FIG. 1 is a perspective view of a light according to the invention.

The light shown in FIG. 1 consists of a straining spoon 10 with a round, sieve-like perforated head 12 that is curved to form a shallow bowl and a stem 14, at the end of which there is a handle 16.

At the outer end of handle 16 there is a hole 18 by which straining spoon 10 can be hung from a hook.

In front of the bowl-shaped head 12 there is an egg-shaped body 20, as shown in the drawing, which is made e.g. from transparent or translucent glass. A lamp 22, possibly in the form of a low-voltage filament lamp or a light emitting diode, is incorporated inside this body 20 by some appropriate means.

The wiring required to operate lamp 22 can be run through the holes in straining spoon 10 to the back of head 12 and then along stem 14 to a power source. Body 20 is fixed in front of head 12 by some suitable unillustrated means, as shown in the drawing.

Figure 2:
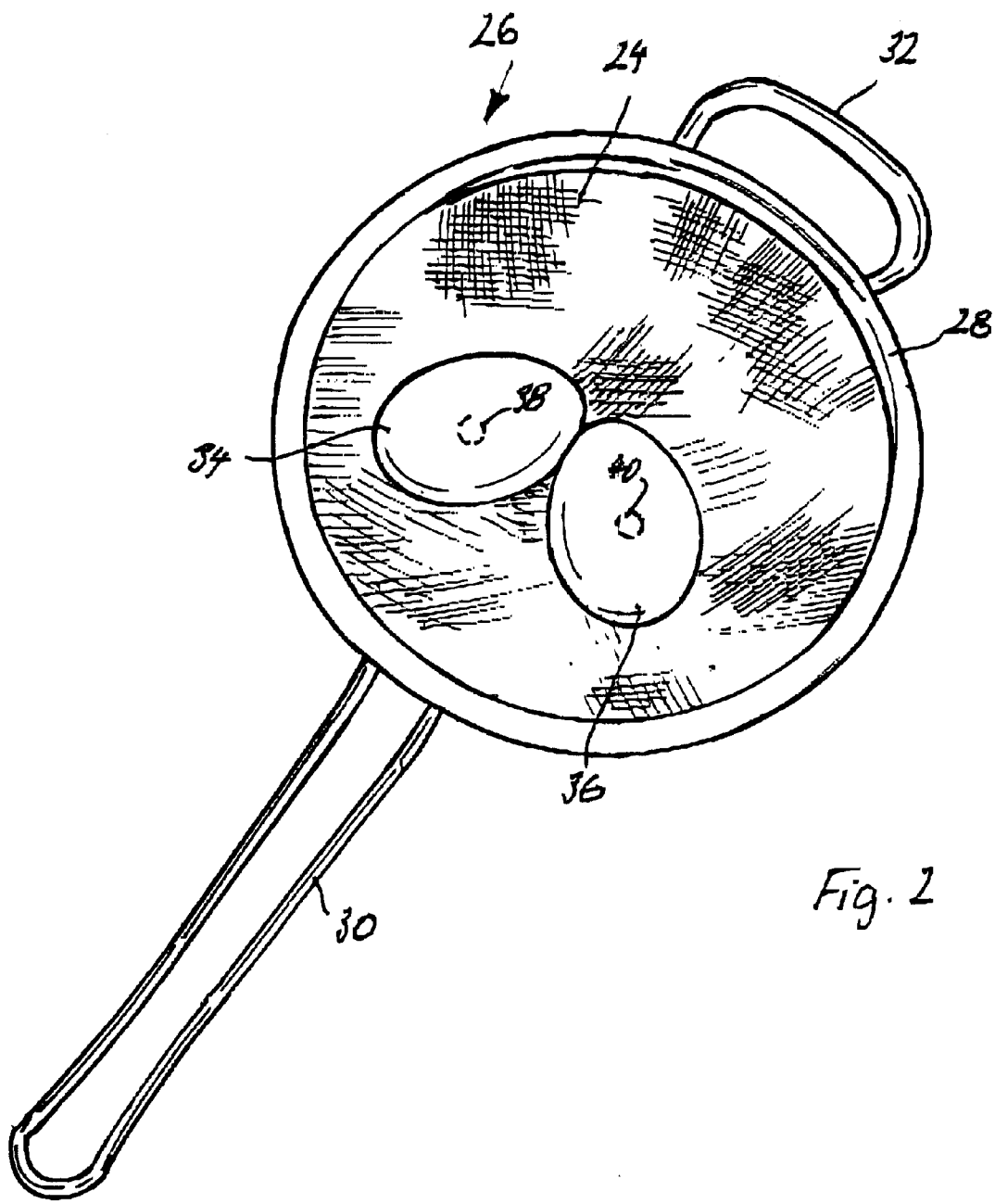
FIG. 2 is a similar view of a second embodiment of the invention.

In the embodiment of FIG. 2 the base 24 of sieve 26 forms a reflector which radiates part of the light to the observer whilst allowing the remainder to pass out the back Through the meshed structure of base 24. The base of the sieve is retained by a ring 28 to which a handle 30 is attached on one side, while on the opposite side there is a support stirrup 32 which is required e.g. to rest the sieve on top of a pan.

On base 24 of the sieve there are two egg-shaped bodies 34,36, which are made from e.g. glass or plastic and may be transparent or translucent. Lamps 38,40, e.g. in the form of light emitting diodes, are inserted inside these egg-shaped bodies 34,36, as already described in connection with the fist embodiment.

Figure 3:
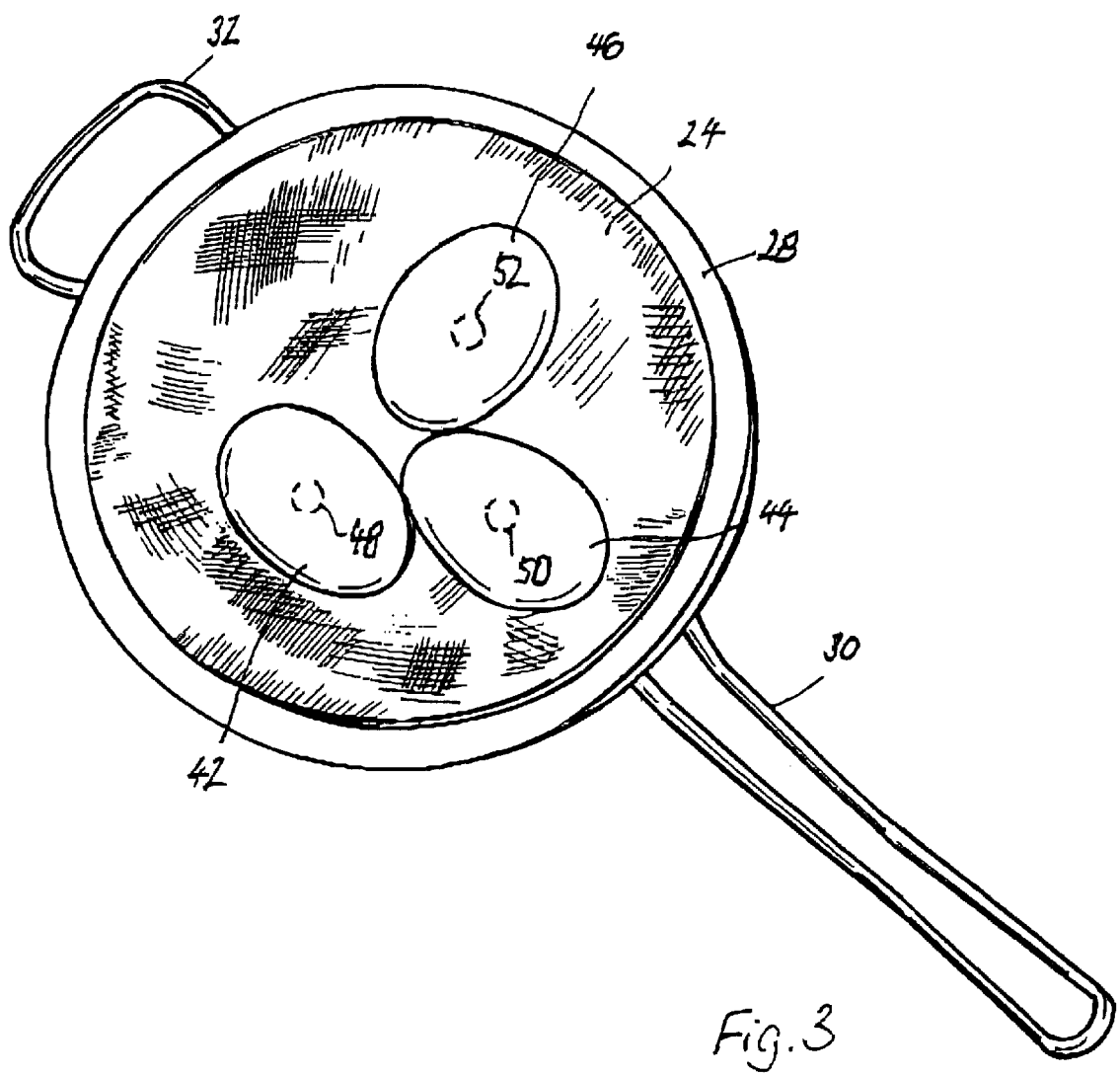
FIG. 3 shows a third embodiment of the invention.

The embodiment of FIG. 3 also uses a sieve 26 as the base. This sieve 26 is composed of the same components as already described in connection with FIG. 2, for which the same reference numerals are also used here, so that no repeat description is necessary.

In this case three egg-shaped bodies 42,44,46 are provided on the base of the sieve. Here too, lumps 48,50,52 are incorporated inside the egg-shaped bodies just as in the previous embodiments.

What is claimed is:

1. A light with a lamp and a reflector, comprising:

a reflector formed by one surface of a kitchen utensil and having a reflector surface, and at least one lamp incorporated in at least one egg-shaped body which is transparent and which is fixed to the kitchen utensil in front of the reflector surface.

2. The light of claim 1, wherein the kitchen utensil is a straining spoon.

3. The light of claim 1, wherein the kitchen utensil is a sieve.

4. The light of claim 1, wherein the at least one lamp is a light emitting diode.

5. The light of claim 1, wherein the at least one lamp is a low-voltage filament lamp.

6. A light with a lamp and a reflector, comprising:

a reflector formed by one surface of a kitchen utensil and having a reflector surface, and at least one lamp incorporated in at least one egg-shaped body which is translucent and which is fixed to the kitchen utensil in front of the reflector surface.

7. The light of claim 6, wherein the kitchen utensil is a straining spoon.

8. The light of claim 6, wherein the kitchen utensil is a sieve.

9. The light of claim 6, wherein the at least one lamp is a light emitting diode.

10. The light of claim 6, wherein the at least one lamp is a low-voltage filament lamp.

* * * * *